June 17, 1952 A. MOTTU 2,600,906
PROJECTION APPARATUS FOR INSPECTING TIMEPIECE JEWELS
Filed July 3, 1951 2 SHEETS—SHEET 1

INVENTOR
ANDRE MOTTU
BY Robert E. Burns
ATTORNEY

June 17, 1952 A. MOTTU 2,600,906
PROJECTION APPARATUS FOR INSPECTING TIMEPIECE JEWELS
Filed July 3, 1951 2 SHEETS—SHEET 2
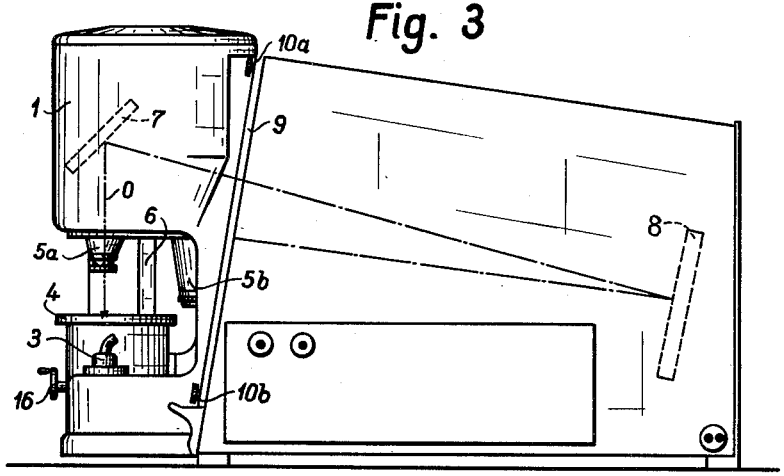
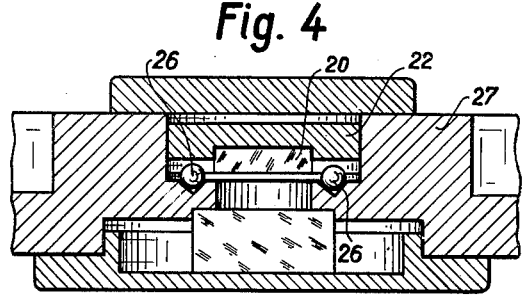
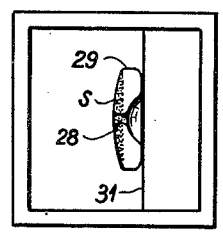
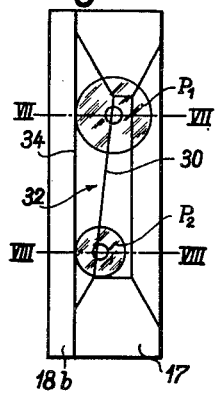
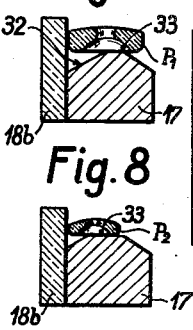
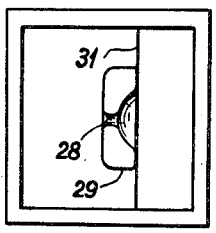
INVENTOR
ANDRE MOTTU
BY Robert E. Burns
ATTORNEY Patented June 17, 1952

2,600,906

UNITED STATES PATENT OFFICE 2,600,906

PROJECTION APPARATUS FOR INSPECTING TIMEPIECE JEWELS

André Mottu, Geneva, Switzerland, assignor to Societe Genevoise d'Instruments de Physique, Geneva, Switzerland, a firm of Switzerland Application July 3, 1951, Serial No. 235,074
In Switzerland July 7, 1950

2 Claims. (Cl. 88—14)

The present invention has for its object a projection apparatus for examination of time-piece jewels, said apparatus allowing an accurate examination of the outline of the perforations provided in such jewels serving as bearings for corresponding spindles.

Outline projectors, as used hitherto in the watchmaking industry for checking mechanical members, are generally executed with a horizontal work-carrying table while the optic axis perpendicular to the table is vertical.

If a transparent time-piece jewel, a ruby or a sapphire for instance, is laid on a work-carrying table in a manner such that the axis of the perforation to be examined is perpendicular to the optic axis and consequently horizontal, the operator only sees the outer outline of the actual jewel without any possibility of seeing the outline of the perforation and in particular the olive shape given to it, this being due to the fact that the light rays passing out of the condenser are reflected by the outer surface of the jewel and cannot enter the latter and illuminate the perforation therein. The reflection of the condenser light by the outer surface of the jewel is due to the fact that the index of refraction of the jewel is higher than that of air.

In order to remove this drawback, it is sufficient to dip the jewel to be examined into a transparent liquid the index of refraction of which is but little different from that of the jewel material. Under such conditions, the projection light is adapted to enter the stone or jewel and the image of the opening is formed on the screen, as if a cross-section of the stone had been made through a diametrical plane.

However, the optic axis of the projector in the vicinity of the table being vertical, it is necessary, if it is desired to control the olive shape of the perforation in the jewel, to position the latter edgeways. Such a positioning of the jewel is a delicate operation, as the thickness of the jewel, with reference to its diameter is very small. On the other hand, there exist jewels one of the surfaces of which shows a more or less marked incurvation, the result of which is a still greater reduction in the importance of the cylindrical part of the jewel. Furthermore, the jewel is not stable as it bears only through the cylindrical portion of its surface. Any movement of the liquid surrounding it would shift it or lead to its dropping onto either of its terminal surfaces.

Outline projectors are already known wherein the work carrying table includes means for examining jewels positioned horizontally through one of their terminal surfaces inside a bath of a suitable liquid. In such prior arrangements, the optic axis is deflected by reflecting surfaces so as to pass horizontally through the jewel and the liquid, i. e. perpendicularly to the vertical axis of the jewel. However, it has been found that reflecting surfaces that are positioned to either side of the jewel and form the actual walls of the liquid-containing vat, may be submitted, due to their contact with the liquid, to an alteration of their silvering according to the nature of the liquid used.

On the other hand, as the indices of refraction of the jewel and of the liquid should be slightly different so that the outline of the perforation may appear on the screen of the projection apparatus, it may occur that the incurved surface of the stone produces a shade S as shown in Fig. 9 of the accompanying drawings, which is objectionable as it interferes with the image. This drawback may be removed by slightly sloping the illuminating beam, while retaining the perpendicular location of the axis of the jewel with reference to the optic axis of the projector. But this arrangement is not executable with projectors of known type.

The present invention allows removing the above drawbacks and it has for its object a projection machine for examining time-piece jewels, said machine being of the type including on one hand a horizontal carrier on which the jewels rest through one of their terminal surfaces, said carrier being immersed in the bath and, on the other hand, reflecting surfaces deflecting the optic axis of the machine in order to give it a horizontal direction perpendicular to the axis of the jewel. The invention has for its object a machine wherein the reflecting surfaces are located outside the bath-containing vat to either of said container.

Accompanying drawings illustrate by way of example a preferred embodiment of a machine according to the invention.

In said drawings:

Fig. 3 is a side view of the machine.

Fig. 4 is a cross-section through line IV—IV of Fig. 2.

Fig. 5 is a detail plan view of the jewel carrier.

Fig. 6 is a side view thereof.

Figs. 7 and 8 are sectional views of said jewel carrier respectively through lines VII—VII and VIII—VIII of Fig. 5.

Figs. 9 and 10 are two views of the screen on which the operator sees the image of the cross-section of the jewel enlarged to the magnification defined by the objective of the projector. Fig. 9 shows the shade produced by the incurved surface of the stone or jewel.

Figure 1:
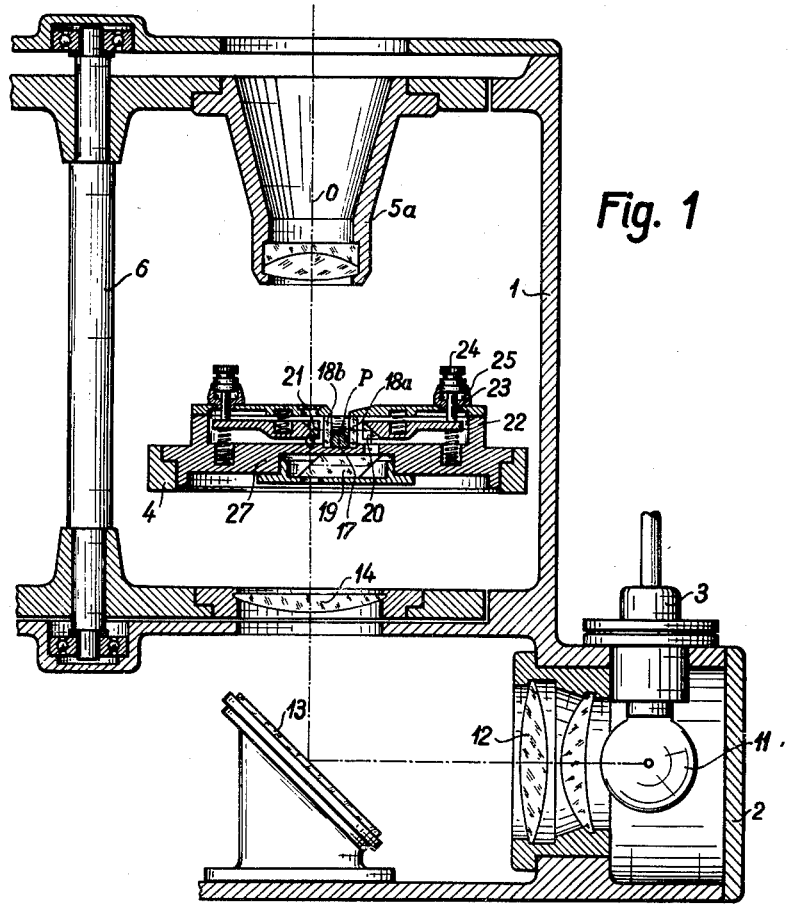
Fig. 1 is a diagrammatic cross-section of the machine through a vertical plane of the machine.

The machine illustrated includes a frame 1, a casing 2 containing the illuminating means 3, a work-carrying table 4 and a plurality of the objectives 5a, 5b registering selectivity with the optic axis O (Fig. 3) and mounted on a rotary turret, the axis of which is shown at 6; reflecting surfaces 7 and 8 project the beam of image-forming rays from the operative objective onto a screen 9 on which are secured the reference drawings as provided through the clamping means 10a and 10b.

The luminous flux from the bulb 11 forming part of the illuminating means 3 passes through a condenser 12 and is reflected by the reflecting surface 13 into a further condenser 14 underneath the work constituted by the jewel. A handwheel 16 illustrated in Fig. 3 allows shifting the table 4 in a direction perpendicular to its plane in order to focus the image of the work through the objective on the screen 9.

Figure 2:
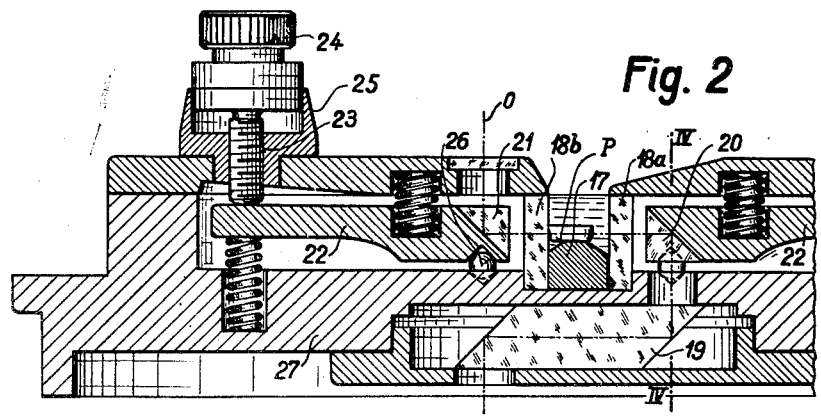
Fig. 2 is a cross-section of a detail of Fig. 1 on an enlarged scale.

In Figs. 1 and 2, the jewel or stone P to be examined remains in position under the action of its own weight and rests through a flat terminal surface on a carrier 17. Said carrier 17 is laid inside a container, two opposite walls 18a and 18b of which are made of glass or the like transparent material, said container being filled with a liquid the index of refraction of which is very near that of the jewel P. The luminous beam passing through the condenser 14 is deflected by a double stationary prism 19 and impinges on a prism 20 of adjustable slope beyond which it passes through the container wall 18a, the jewel P and the wall 18b and it is finally deflected by a prism 21 back into the direction of the optic axis of the projector. This arrangement of the container cuts out any contact between the liquid and the reflecting surfaces of the prism 20 and 21 and thereby any possibility of a chemical attack on their silver coating.

In order to allow an inclination with reference to the horizontal plane of the light beam passing through the jewel P, the prisms 20 and 21 are each secured to a carrier 22 the slope of which is controlled by means of a screw 23 that is actuated by a control knob 24 provided with a mark registering with a scale carried by a stationary nut 25 into which said screw 23 is engaged. Each carrier 22 is pivotally carried by a ball 26 that is held fast in a recess provided in the supporting plate 27 of the machine. This slope given to the luminous beam with reference to the horizontal plane allows reducing the losses of luminosity due to the incurved surfaces shown by certain jewels and that would otherwise produce a shaded area S as shown in Fig. 9. It is also possible to provide for an adjustable mounting of only one prism, such as the prism 20.

Figs. 9 and 10 show the images of the jewels as they appear on the screen 9 of the projector. 28 designates the apparent outline of the olive-shaped perforation and of the recess formed in the jewel while 29 designates the outline of the actual jewel. The image of a ridge 30 of the carrier 17 is drawn at 31. In the embodiment illustrated, the deflection by 90° of the optic axis leads to a similar turning of the image, following which the horizontal lines of the work or jewel become vertical.

Figs. 5 to 8 illustrate with further detail the carrier 17. An oblique bevel 32 is provided on said carrier. The edge 30 of said bevel lies in the upper surface 33 of the carrier on which the jewel rests and it is oblique with reference to the ridge 34 of the bevel contacting with the wall 18b of the container. This arrangement allows laying on the carrier jewels P1 and P2 of different diameters (Figs. 7 and 8) and the outer edges of which lie in contact with the wall 18b of the container while their centers are located in all cases substantially over the ridge 30 so that the outline of the perforation and the ridge 30 may appear clearly on the screen whatever may be the diameter of the jewel. As a matter of fact, the jewel appears on the screen as if it were cut along a diametrical plane and the plane in which the objective 5 is focused passes through the diameter of the jewel that is perpendicular to the horizontnal portion of the optic axis. In order to provide for a clear image on the screen 9 of the ridge 30 carrying the jewel, it should lie substantially in register with the focusing plane and this may be obtained by adjusting the location of the jewel over the oblique bevel 32.

What I claim is:

1. A projecting apparatus for examining timepiece jewels comprising a carrier with a horizontal surface on which the jewel to be examined is adapted to rest, said carrier being bevelled along a surface cutting the upper surface and one side wall of the carrier, the bevel surface meeting the upper surface of the carrier along a horizontal line that is oblique with reference to the side wall of the carrier into which the bevel surface extends, a vat filled with a liquid the index of refraction of which approximates that of the jewel and inside which said carrier is laid, said vat including two transparent vertical walls facing each other, the bevelled side wall of the carrier being adapted to be laid in contact with one of said vertical walls, illuminating means producing a vertical beam of light, means for producing an image of the jewel illuminated by said beam, reflecting surfaces located to either side of the vat and outside last mentioned walls and adapted to reflect the vertical beam produced by the illuminating means horizontally through the jewel and then back vertically towards the image-producing means.

2. A projecting apparatus for examining timepiece jewels comprising a carrier with a horizontal surface on which the jewel to be examined is adapted to rest, said carrier being bevelled along a surface cutting the upper surface and one side wall of the carrier, the bevel surface meeting the upper surface of the carrier along a horizontal line that is oblique with reference to the side wall of the carrier into which the bevel surface extends, a vat filled with a liquid the index of refraction of which approximates that of the jewel and inside which said carrier is laid, said vat including two transparent vertical walls facing each other, illuminating means producing a vertical beam of light, means for producing an image of the jewel illuminated by said beam, reflecting surfaces located to either side of the vat and outside last mentioned walls and adapted to reflect the vertical beam produced by the illuminating means horizontally through the jewel and then back vertically towards the image producing means and means for controlling the angular position of at least one of said reflecting surfaces with reference to a horizontal axis that is perpendicular to the beam of light.

ANDRÉ MOTTU.

REFERENCES CITED

The following references are of record in the file of this patent:

UNITED STATES PATENTS

| Number | Name | Date |
|---|---|---|
| 1,525,658 | Roach | Feb. 10, 1925 |
| 1,789,009 | Luce | Jan. 13, 1931 |
| 2,170,967 | Eppenstein et al. | Aug. 29, 1939 |
| 2,387,825 | Bond | Oct. 30, 1945 |

FOREIGN PATENTS

| Number | Country | Date |
|---|---|---|
| 592,529 | France | May 1, 1925 |